United States Patent [19]
Inaba et al.

[11] Patent Number: 5,498,111
[45] Date of Patent: Mar. 12, 1996

[54] SCREW CONNECTOR

[75] Inventors: Shigemitsu Inaba; Masayuki Yamamoto, both of Shizuoka, Japan

[73] Assignee: Yazaki Corporation, Tokyo, Japan

[21] Appl. No.: 156,845

[22] Filed: Nov. 24, 1993

[30] Foreign Application Priority Data

Nov. 24, 1992 [JP] Japan .................. 4-080793 U

[51] Int. Cl.⁶ .................. F16B 37/08; F16B 37/14
[52] U.S. Cl. .................. 411/432; 411/429; 411/377; 411/903
[58] Field of Search .................. 411/34–38, 377, 411/429, 431, 427, 432, 903, 908

[56] References Cited

U.S. PATENT DOCUMENTS

| | | | |
|---|---|---|---|
| 4,059,199 | 11/1977 | Quaney | 411/427 X |
| 4,397,437 | 8/1983 | Madej | 411/431 X |
| 4,815,920 | 3/1989 | Morooka | 411/377 X |
| 4,883,399 | 11/1989 | MacLean | 411/377 X |
| 5,051,636 | 9/1991 | Ishimoto et al. | 411/34 X |
| 5,253,962 | 10/1993 | Close, Jr. | 411/34 |

FOREIGN PATENT DOCUMENTS 64-035881  2/1989  Japan .

*Primary Examiner*—Neill R. Wilson
*Attorney, Agent, or Firm*—Wigman, Cohen, Leitner & Myers

[57] ABSTRACT

The present invention is a method of manufacturing a screw connector by an injection metal mold. The screw connector includes a connector main body and a nut embedded in the connector main body. An axis of the nut extends in a forward and backward direction of the connector main body. The screw connector further includes a first opening located on a front side of the nut to be inserted by a bolt of a mating connector and a first columnar space located on a rear side of the nut to receive a distal end portion of the bolt. The method includes the three steps. The first step is setting said metal mold in such a state that said nut is held by a front projection portion and a rear projection portion. This front projection portion projects rearwardly and having a small diameter portion and a portion having larger diameter than said small diameter portion. This rear projection portion projects forwardly to be in contact with a rear end face of said nut. The second step is injecting a melted resin in said metal mold. The third step is separating a resin molded product from said metal mold.

7 Claims, 6 Drawing Sheets

SCREW CONNECTOR

BACKGROUND OF THE INVENTION

1. Technical Field

The present invention relates to a screw connector performing connector coupling by engagement between bolt and nut.

2. Background Art

FIG. 1 shows a conventional screw connector (Japanese Patent Application for Disclosure No. 64-35881). This screw connector 25 comprises one connector 28 having a bolt 27 inserted in its central through hole 26 and the other connector 30 in which a nut 29 corresponding to the bolt 27 is integrally molded. The other connector 30 is incorporated in a connection box 31.

Each terminal portion 33 of bus bar circuit 32 projects from connector 28 to connect with each corresponding terminal (not shown) provided in each terminal receiving hole 34 of the other connector 30 when bolt 27 and nut 29 are engaged together.

However, in the conventional screw connector, chips 35 of nut 29 or the surrounding members are often generated on engaging or disengaging bolt 27 to nut 29 so that the chips 35 tend to cause circuit short of terminals 33 or connection box 31.

Therefore, as shown in FIG.2, there has been proposed a method in which a hollow tubular cap portion 37 is integrally formed by molding with a connector housing 38 in the bolt insertion direction to nut 36 so as to seal such chips in its hollow portion 39.

That is, the tubular cap portion 37 is formed by insert molding the nut 36 in the connector housing 38 using a forming mold 43 in which a step portion 42 for the nut contact is provided at the base portion of a pin 41 to be inserted through the thread hole 40 of nut 36.

However, in such a method, though one end of nut 36 can be fixed by the step portion 42 of forming mold 43, the other end of nut 36 is only pressed by the surrounding resin material. Therefore, nut 36 tends to shift vertically or incline.

SUMMARY OF THE INVENTION

An object of the present invention is to provide a screw connector having a closed space for sealing chips to be generated on engagement of its bolt and nut and preventing the locational shift of the nut on the connector forming and a manufacturing method of the same connector.

To achieve the above object, the present invention provides a method of manufacturing a screw connector by an injection metal mold. This screw connector includes a connector main body and a nut embedded in the connector main body. The axis of the nut extends in a forward and backward direction of the connector main body. This screw connector further includes a first opening located on a front side of the nut to be inserted by a bolt of a mating connector and a first columnar space located on a rear side of the nut to receive a distal end portion of the bolt.

This method comprises the three steps. The first step is setting said metal mold in such a state that said nut is held by a front projection portion and a rear projection portion. This front projection portion projects rearwardly and having a small diameter portion to be inserted into a female thread hole of said nut and a portion having larger diameter than said small diameter portion to be in contact with a front end face of said nut. This rear projection portion projects forwardly to be in contact with a rear end face of said nut. The second step is injecting a melted resin in said metal mold. The third step is separating a resin molded product from said metal mold.

In the above inventive manufacturing method of screw connector, since the resin can be injected in the state where the nut is fixed by the front and rear projection portions, the positional shift of the nut can be prevented on the molding process.

The present invention also provides a screw connector. The screw connector includes a connector main body formed by an injection molded product and a nut embedded in the connector main body. An axis of the nut extends in a forward and backward direction of the connector main body. The connector main body has a first opening extending forwardly from a front end face of the nut to a exterior of the connector main body. A internal diameter of the first opening is larger than a thread diameter of the nut. The connector main body further has a first columnar space extending backwardly from a rear end face of the nut. A internal diameter of the first columnar space is equal to the thread diameter of the nut and the first columnar space being closed at a distal end thereof. The connector main body further has a second opening extending from a part of a outer circumference of a rear end portion of the nut to the exterior of the connector main body.

In the inventive screw connector, since the nut can be fixed both by a front projection portion to be inserted in the first opening and by a rear projection portion to be inserted in the second opening on the molding process, the positional shift of the nut in its axis and radial directions can be prevented.

The present invention further provides a screw connector. The screw connector includes a connector main body formed by an injection molded product and a nut embedded in the connector main body. An axis of the nut extends in a forward and backward direction of the connector main body. The connector main body has a third opening extending forwardly from a front end face of the nut to a exterior of the connector main body. An internal diameter of the third opening is larger than a thread diameter of the nut. The screw connector further includes a fourth opening extending from a part of an outer circumferential face of the nut to the exterior of the connector main body, a second columnar space extending backwardly from a rear end face of the nut. An internal diameter of the second columnar space is equal to the thread diameter of the nut. The second columnar space is closed at a distal end thereof. The screw connector further includes a fifth opening extending from a part of the rear end face of the nut to the exterior of the connector main body.

In the inventive screw connector, since the nut can be fixed by a projection portion to be inserted in the third opening, another projection portion to be inserted in the fourth opening and still another projection portion to be inserted in the fifth opening, the positional shift in the axis and radial directions of the nut can be prevented on the molding process.

These and other objects, features and advantages of the present invention will be more apparent from the following description of preferred embodiments, taken in conjunction with the accompanying drawings.

DESCRIPTION OF THE PREFERRED EMBODIMENT

First Embodiment

Hereinafter, we will describe the first embodiment of the present invention with reference to the drawings.

Figure 1:
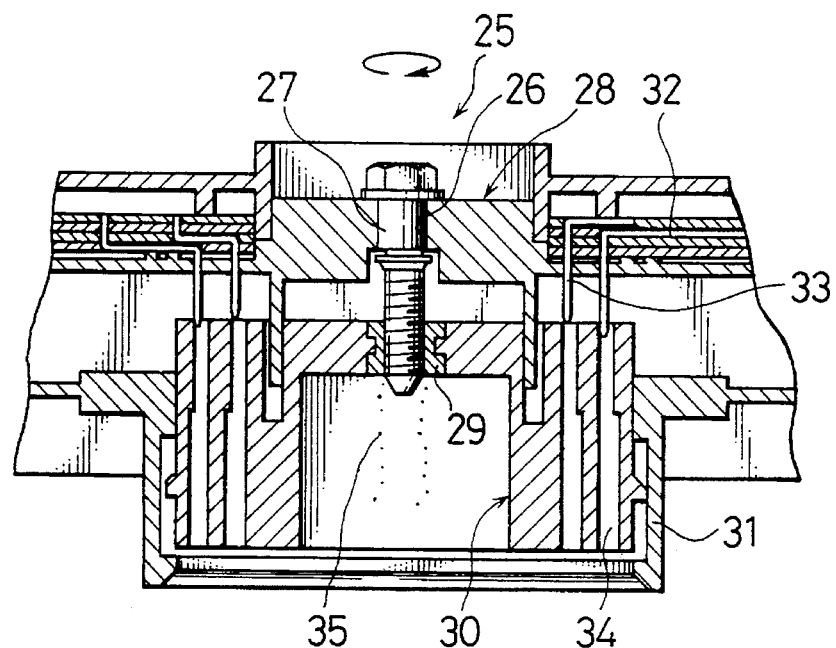
FIG. 1 is a cross section of an example of the prior art.
Figure 2:
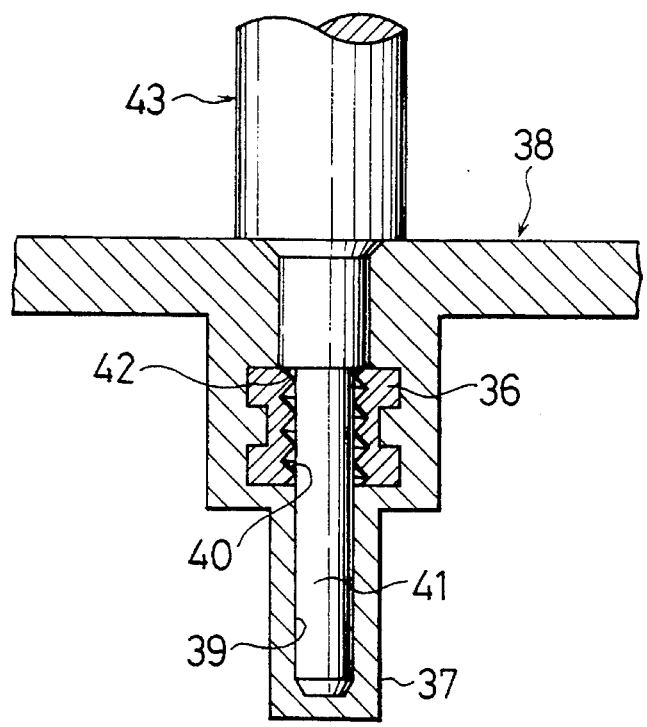
FIG. 2 is a cross section of the connector of the back ground art.
Figure 3:
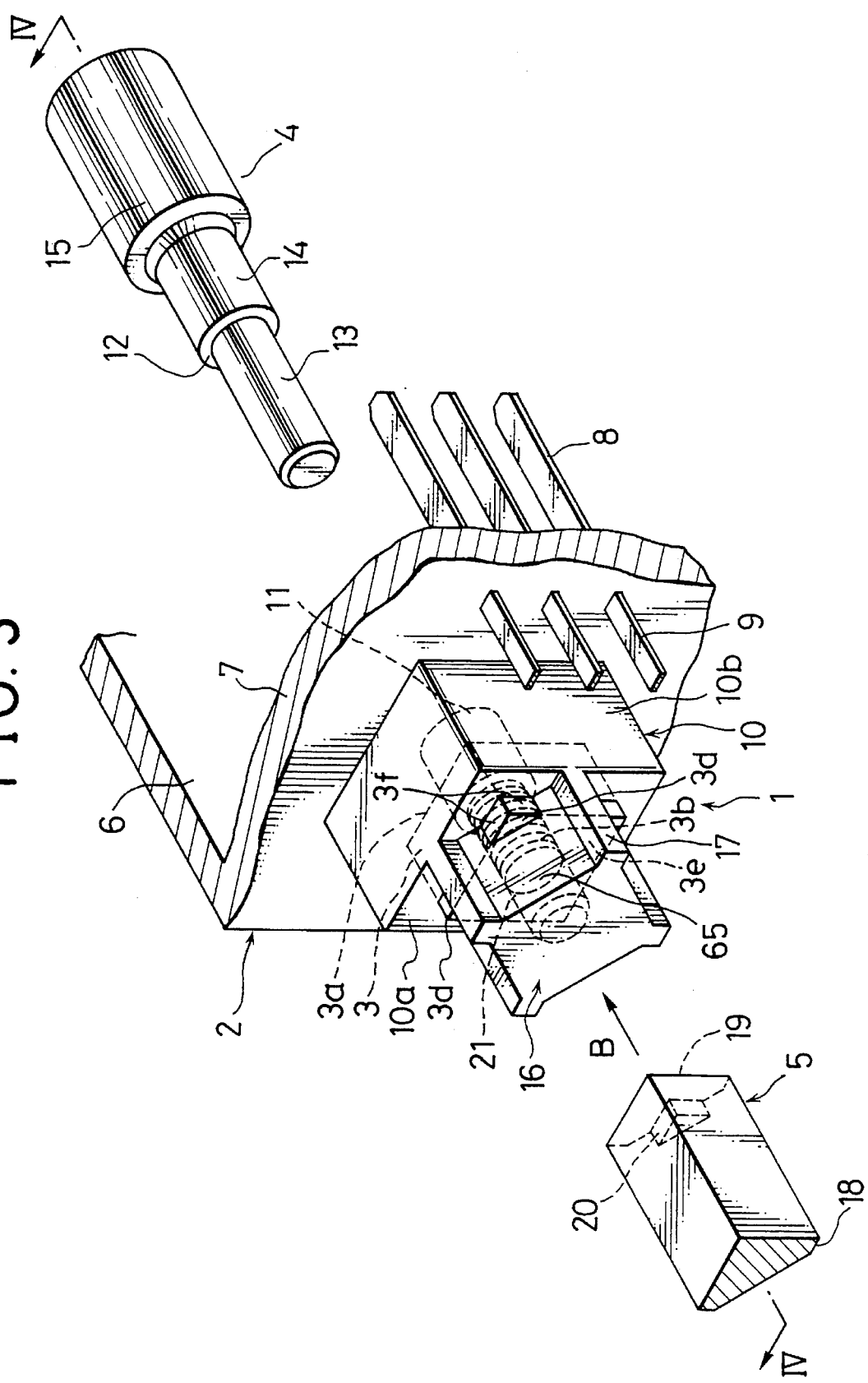
FIG. 3 is a decomposed perspective view showing a first embodiment of the screw connector and its manufacturing method according to the present invention.
Figure 4:
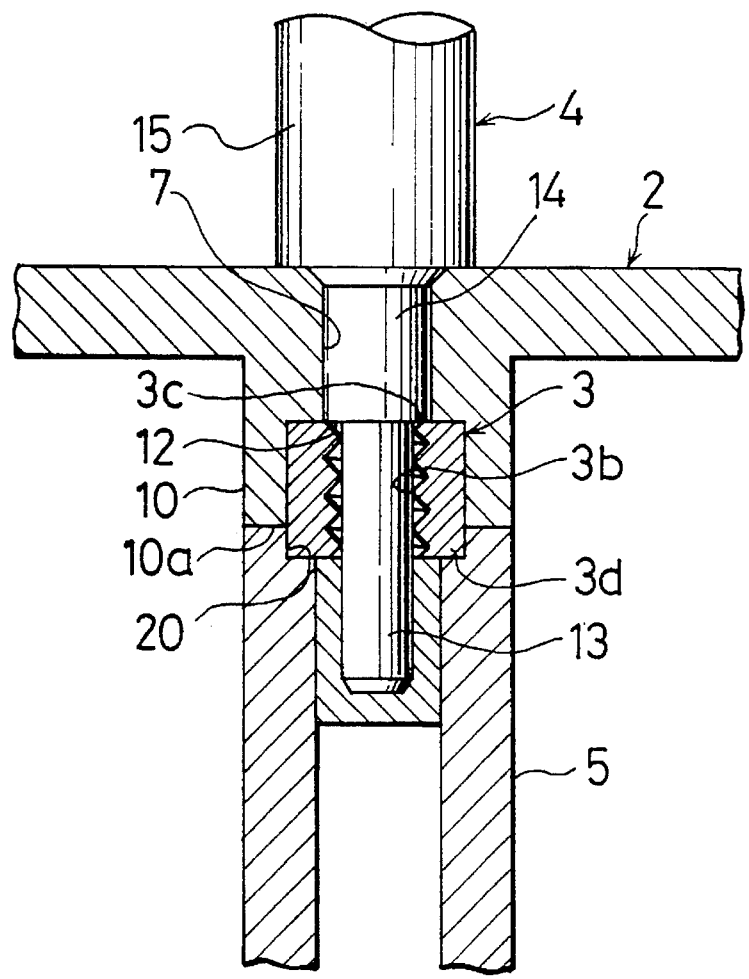
FIG. 4 is a cross section taken along the line IV—IV of FIG. 3 to show the insert molding state of the nut.
Figure 5:
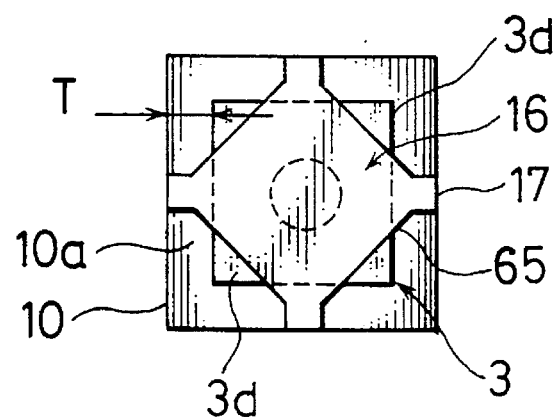
FIG. 5 is a plan view seen in the direction B of FIG. 3.

FIG. 3 is an exploded perspective view showing the first embodiment of the screw connector and its manufacturing method according to the present invention. FIG. 4 is a cross section taken along the line IV—IV of FIG. 3 to show the insert molding state of the nut. FIG. 5 is a plan view seen along the direction B of FIG. 3.

In these drawings, reference numeral 1 denotes a connector formed by integrally molding connector housing 2 consisting of a synthetic resin with nut 3. Moreover, reference numeral 4 shows the upper mold for determining the nut position, and 5 designates the corresponding lower mold.

Connector 1 is coupled with another mating connector (not shown) in its engaging cavity 6 by engaging nut 3 with the corresponding bolt of the mating connector. Thus, these connectors are electrically connected by respectively connecting pin terminals 8 extending through bottom wall 7 of engaging cavity 6 to the corresponding terminals of the mating connector. Further, the base ends 9 of these pin terminals 8 are connected to a circuit board (not shown), respectively.

On the bottom wall 7 of connector housing 2 a pillar portion 10 for fixing the nut is integrally formed in a rectangular shape. That is, the tetragonal nut 3 is mold-fixed in the pillar portion 10. From the bottom wall 7 to the upper end face 3a of nut 3 in pillar portion 10 a bolt insertion hole 11 is provided. The diameter of bolt insertion hole 11 is larger than the thread hole 3b of nut 3 so that the periphery of the nut upper face 3a around the thread hole is exposed in insertion hole 11.

The position of the exposed upper face 3c of nut 3 (FIG. 4) is determined by a step portion 12 of upper mold 4.

The upper mold 4 has a pin-like small diameter portion 13 to be inserted in the thread hole 3b of nut 3 at its front end, an intermediate diameter portion 14 for forming the bolt insertion hole 11 at its intermediate portion, and a large diameter portion to be in contact with the housing bottom wall 7 at its base end, coaxially. Thus, the upper end position of nut 3 is determined by contacting the step portion 12 defined by these small and intermediate diameter portions 13 and 14 with the exposed portion 3c of nut upper face 3a around the thread hole.

On the other hand, the lower end four corners 3d of nut 3 projects from the bottom face 10a of pillar portion 10, and a hollow tubular cap portion 16 having notched portions 65 for respectively exposing the four corners 3d of the nut lower end face 3e is also integrally projecting from pillar portion 10. Namely, each corner 3d of nut lower end face 3e and part of two adjacent side nut walls 3f following the face 3e are exposed outward from the pillar portion 10, i.e., each notched portion 65. Moreover, at the four corners of tubular cap portion 16 projections 17 defining the same face to each side face 10b of pillar portion 10 are provided respectively shifting by 45° to the four corners 3d of nut 3.

Since the thickness T of pillar portion 10 is set to be relatively thin as compared to nut 3 and the lower corner portions 3d of nut 3 are exposed, the nut 3 can be bent together with pillar portion 10 so that chip occurrence can be suppressed by the elastic movement of nut 3 even if the bolt (not shown) is inclinedly inserted.

The notched portions 65 are formed by the lower mold 5. The lower mold 5 is formed in a substantially triangular shape and has end faces 18 at its both ends corresponding to each projection 17 of tubular cap portion 16. At the upper end portion 19 of the lower mold 5 a triangular position determining groove 20 is provided corresponding to each corner portion 3d of nut 3. Thus, the lower end position of nut 3 is determined by contacting the position determining groove 20 with the lower end face 3e of nut 3 and adjacent two side faces 3f following the face 3e. As a result, the nut 3 is supported stably by the upper and lower molds 4 and 5 in both the vertical and horizontal directions, thereby being stably mold-fixed without any positional shift and inclining to the pillar portion 10 and tubular cap portion 16 of housing 2.

Additionally, the tubular cap portion 16 includes a hollow portion 21 which serves as bolt insertion hole and chip receiver. The hollow portion 21 is formed by the pin-like small diameter portion 13 of upper mold 4.

In the above embodiment, the configuration of nut 3 is not limited to rectangles. Thus, it is possible to adopt any shapes of nut such as circular or the like types as far as it can define the exposed portions like corner portions 3d of nut 3 to be used as position determining base to the lower mold 5.

Second Embodiment

Figure 6:
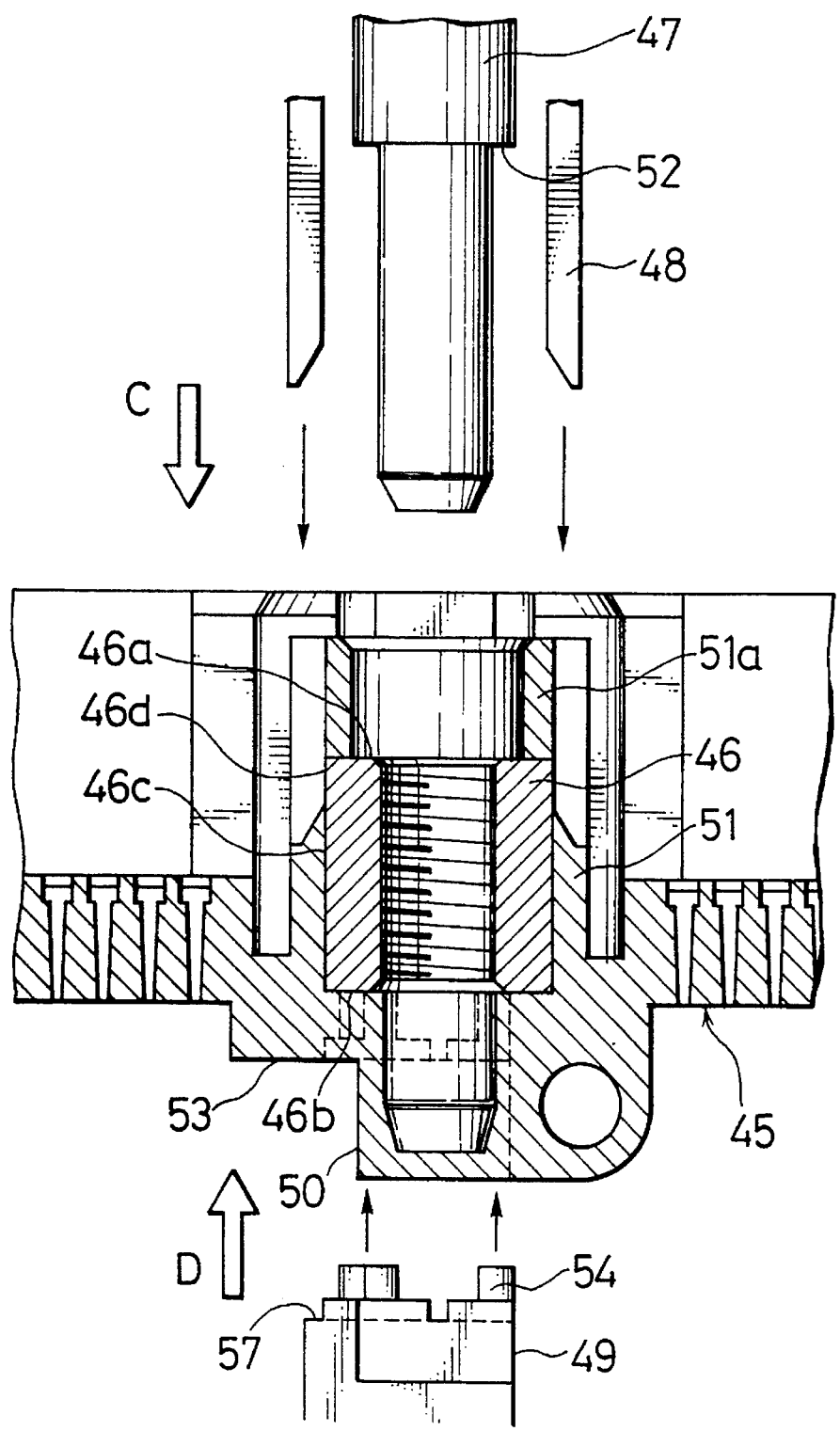
FIG. 6 is a cross section of a second embodiment of the screw connector and its manufacturing method according to the present invention.
Figure 7:
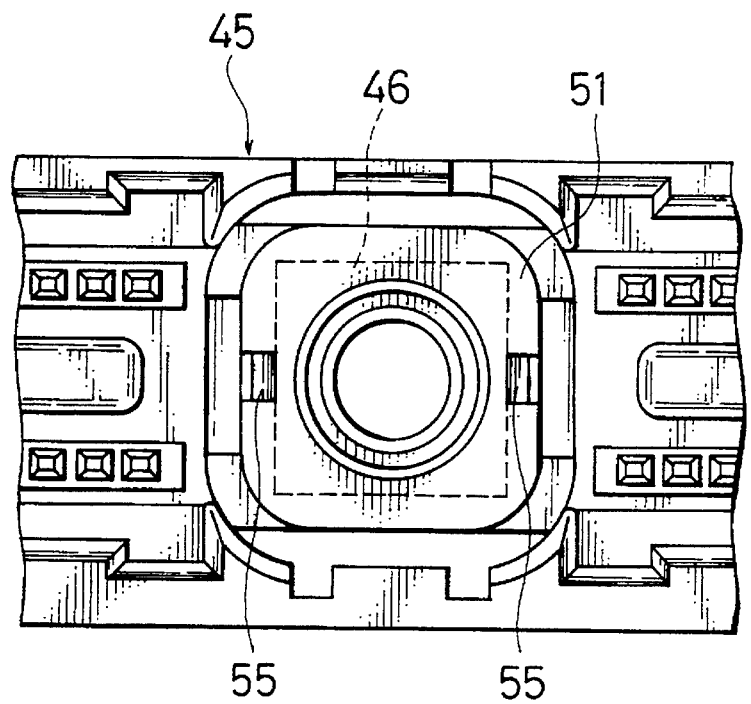
FIG. 7 is a top view seen in the direction C of FIG. 6.
Figure 8:
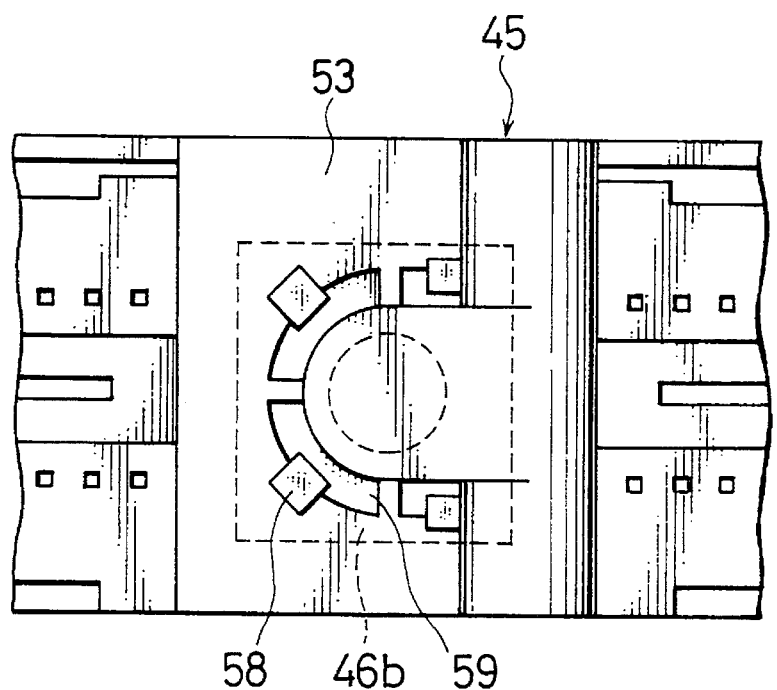
FIG. 8 is a bottom view seen in the direction D of FIG. 6.
Figure 9:
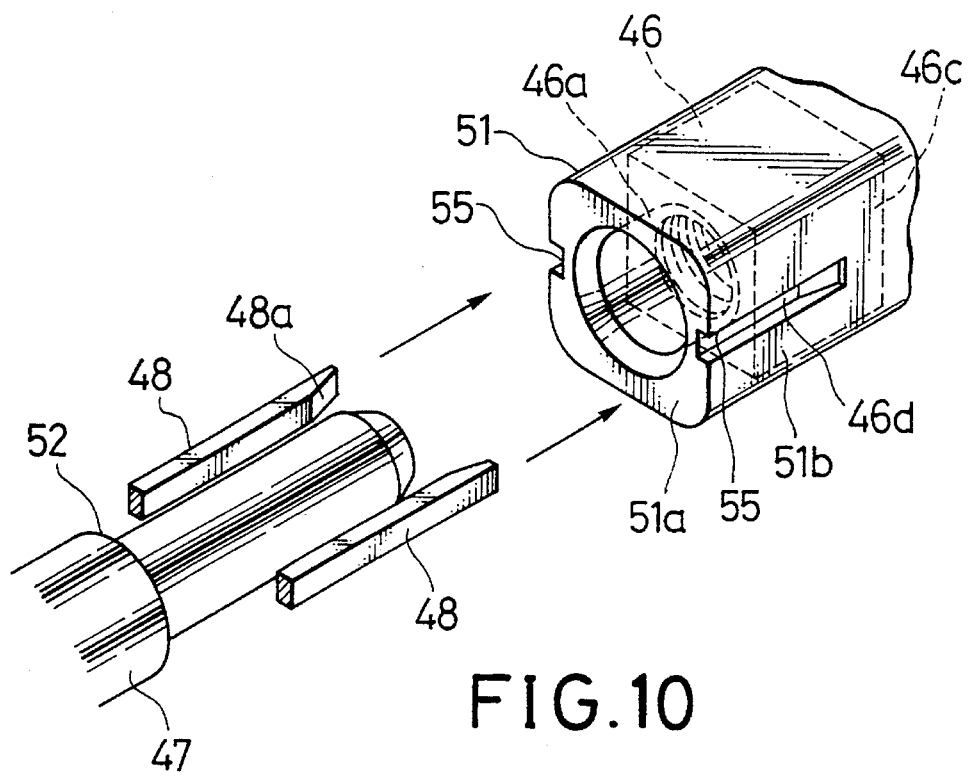
FIG. 9 is a perspective view of an important portion along the direction C of FIG. 6.
Figure 10:
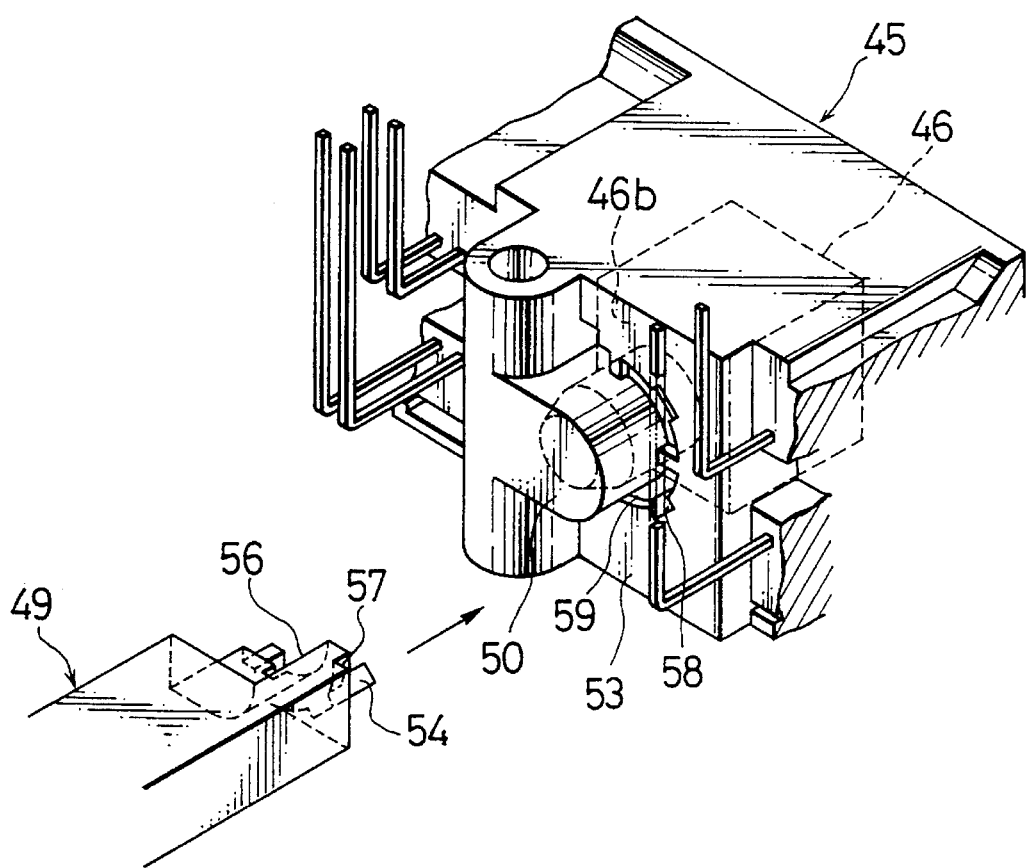
FIG. 10 is a perspective view of a portion along the direction D of FIG. 6.

FIG. 6 shows a cross section of the second embodiment of screw connector and its manufacturing method according to the present invention. FIG. 7 is a top view of the second embodiment, and FIG. 8 is a bottom view of the same. In addition, FIGS. 9 and 10 show important portions of the same, respectively.

In the drawings, reference numeral 45 denotes a connector housing consisting of a synthetic resin, and 46 designates a tetragonal nut which is mold-fixed in the connector housing. Additionally, 47, 48 show two kinds of upper molds and 49 is the corresponding lower mold.

In the connector housing 45 a hollow tubular cap portion 50 is formed by a pillared first upper mold 47 as described in the first embodiment along the bolt insertion direction. Nut 46 is located at the upper portion of tubular cap portion 50 and surrounded by a nut-fixing inner wall 51 defining a square pillar. The upper end portion 51a of nut-fixing inner wall 51 is formed above the nut 46.

In this case, the horizontal positional determination of nut 46 is carried out both by pressing downward the nut upper end face 46a by a step portion 52 of first upper mold 47 and by pressing upward the nut lower end face 46b by position determining projections 54 of lower mold 49 on the opposite side, i.e., from the outer wall 53 of connector housing 45.

At the same time, a pair of vertical grooves 55 (FIG. 7) are formed along both side faces 51b of nut fixing inner wall 51 by the pair of second upper molds 48 each formed in a rectangular pin shape and inserted along the bolt insertion direction from the upper end portion 51a of nut fixing inner wall 51, so that the central portions of both side faces 46c of nut 46 are exposed in the vertical grooves 55, respectively (FIGS. 7 and 9). Thus, the vertical positional determination of nut 46 is carried out by slidably contacting the pair of second upper molds 48 on the exposed portions 46d of both side faces 46c of nut 46. The rectangular pin shaped second upper molds 48 have tapered portions 48a so formed as to face each other, respectively. Thus, the slidable contact of second molds 48 to nut 46 can be achieved smoothly by the tapered portions 48a.

On the other hand, the lower mold 49 has an inner notched portion 56 with a circular arc shape corresponding to the outer shape of tubular cap portion 50 in the connector housing 45 as shown in FIG. 10. Moreover, the mold 49 has the position determining projections 54 at its distal end. At the base portion of each projection 54 a circular arc step portion 57 is formed. Thus, the positional determination of inner notched portion 56 is carried out on the mold shaping along the tubular cap portion 50 while the position determining projections 54 are inserted from the outer wall 53 of connector housing 45 to the bottom face 46b of nut 46 to form several (four in FIG. 10) bottom face exposing holes 58. In addition, the step portion 57 defines circular arc grooves 59 along the tubular cap portion 50 for forming insertion support spaces of the position determining projections 54 to prevent their breakage.

According to the second embodiment, the nut 46 can be rigidly mold-fixed since only the central portion of each side face 46c of nut 46 is exposed, thereby enhancing the screw torque.

In summary, according to the above embodiments, the position of the nut can be determined certainly by holding it with the upper and lower molds. Therefore, the stable nut fixing without any positional shift can be realized, and the chip occurrence to be caused by nut inclination can be prevented. Accordingly, the connector coupling by the engagement of corresponding bolt and nut can be carried out smoothly, thereby enhancing the workablity.

Although several preferred embodiments of the present invention have been specifically described herein, it will be apparent to those skilled in the art to which the invention pertains that variations and modifications of those embodiments shown and described herein may be made without departing from the spirit and scope the invention. Accordingly, it is intended that the invention be limited only to the extent required by the appended claims and the applicable rules of law.

What is claimed is:

1. A screw connector, comprising:

a connector main body formed by an injection molded product; and a nut embedded in said connector main body, an axis of said nut extending in a forward and rearward direction of said connector main body;

said connector main body having:

a first opening extending forwardly from a front end face of said nut to an exterior of said connector main body, a internal diameter of said first opening being larger than a thread diameter of said nut, said first opening for receiving a projection portion of a metal mold to prevent said nut from moving forwardly;

a first columnar space extending backwardly from a rear end face of said nut, an internal diameter of said first columnar space equal to said thread diameter of said nut, said first columnar space being closed at a distal end thereof; and a second opening extending from a part of an outer circumference of a rear end portion of said nut to said exterior of said connector main body, said second opening for receiving a projection portion of a metal mold to prevent said nut from moving rearwardly and sidewardly.

2. A screw connector according to claim 1 wherein: an outer circumferential face and said rear end face of said nut are exposed in said second opening, and said second opening extends backwardly from a part of said outer circumference of said rear end portion of said nut to said exterior of said connector main body.

3. A screw connector according to claim 2 wherein: a first portion of said connector main body surrounding said nut is formed into a tubular portion with a rectangular cross section, and a second portion of said connector main body surrounding said first columnar space and surrounded by said second opening is formed into a tubular portion with closed end thereof with a rectangular cross section, said second portion with said rectangular cross section being provided at such position that each corner of said second portion with said rectangular cross section is located at a middle portion of a side of said first portion, said second openning being formed at said each corner of said rectangular end of said first portion.

4. A screw connector, comprising:

a connector main body formed by an injection molded product; and a nut embedded in said connector main body, an axis of said nut extending in a forward and rearward direction of said connector main body;

said connector main body having:

a first opening extending forwardly from a from end face of said nut to an exterior of said connector main body, an internal diameter of said first opening being larger than a thread diameter of said nut, said first opening for receiving a projection portion of a metal mold to prevent said nut from moving forwardly;

a second opening extending from a part of an outer circumferential face of said nut to said exterior of said connector main body for receiving a projection portion of a metal mold to prevent said nut from moving sidewardly;

a columnar space extending backwardly from a rear end face of said nut, an internal diameter of said columnar space equal to said thread diameter of said nut, said columnar space being closed at a distal end thereof; and a third opening extending from a part of said rear end face of said nut to said exterior of said connector main body for receiving a projection portion of a metal mold to prevent said nut from moving rearwardly.

5. A screw connector according to claim 4, wherein said second opening extends forwardly from said outer circumferential face of said nut.

6. A screw connector according to claim 4, wherein said third opening extends backwardly from said rear end face of said nut.

7. A screw connector according to claim 6, wherein a portion of said third opening which is in contact with said nut includes a plurality of parts which are diposed apart from each other circumferentially about said axis of said nut.

* * * * *